(12) United States Patent
Olson

(10) Patent No.: US 7,308,535 B1
(45) Date of Patent: Dec. 11, 2007

(54) SELF-TRIGGERING OUTGOING BUFFERS

(75) Inventor: Dave Olson, Palo Alto, CA (US)

(73) Assignee: QLogic, Corporation, Aliso Viejo, CA (US)

( * ) Notice: Subject to any disclaimer, the term of this patent is extended or adjusted under 35 U.S.C. 154(b) by 500 days.

(21) Appl. No.: 10/927,170

(22) Filed: Aug. 25, 2004

Related U.S. Application Data

(60) Provisional application No. 60/599,565, filed on Aug. 5, 2004, provisional application No. 60/574,402, filed on May 25, 2004.

(51) Int. Cl.
G06F 12/00 (2006.01)

(52) U.S. Cl. .................................. 711/118; 711/163

(58) Field of Classification Search ............ None
See application file for complete search history.

(56) References Cited

U.S. PATENT DOCUMENTS

2002/0095536 A1* 7/2002 Emberty et al. ............ 710/65
2005/0055536 A1* 3/2005 Ansari ........................... 712/4
2005/0182886 A1* 8/2005 Edirisooriya et al. ....... 710/310
2005/0286856 A1* 12/2005 Aerts ........................... 386/46

* cited by examiner

Primary Examiner—Reginald Bragdon
Assistant Examiner—Ngoc Dinh
(74) Attorney, Agent, or Firm—Klein, O'Neill & Singh, LLP

(57) ABSTRACT

A buffer output manager facilitates automatic self-triggering output of buffer contents. At least one processes writes control data to at least one buffer, the control data being such that a buffer output trigger address can be determined therefrom. For each buffer to which control data is written, a buffer output manager determines the trigger address of that buffer. At least one process writes data to at least one buffer, including to the trigger address thereof. For each buffer to which data is written to the trigger address, the buffer output manager automatically outputs the contents of that buffer, responsive to the writing of the data to the trigger address.

3 Claims, 3 Drawing Sheets

SELF-TRIGGERING OUTGOING BUFFERS

CROSS-REFERENCE TO RELATED APPLICATIONS

This application claims priority under 35 U.S.C. § 119(e) from U.S. Provisional Patent Application Ser. No. 60/574,402, filed May 25, 2004, and from U.S. Provisional Patent Application Ser. No. 60/599,565, filed Aug. 5, 2004. The entirety of each of these provisional patent applications is incorporated herein by reference.

BACKGROUND

1. Field of Invention

The present invention relates generally to efficient buffer management in a computer system, and more specifically to automatically self-triggering the outbound processing of buffer contents.

2. Background of Invention

The speed and efficiency of an integrated circuit or computer program is affected by the efficiency of the processing of buffer output. Both hardware and software architectures frequently involve large numbers of buffers, to which various data are written during system operation. The contents of these buffers are then output to various destinations. Because of the large number of buffers potentially involved in a system, even relatively minor inefficiencies in output management can introduce substantial latency.

In the prior art, buffer output is typically managed by first writing data to a buffer, and then initiating a start operation to begin the output processing, once the buffer is full. This method works, but uses dedicated clock cycles to begin the output processing, thereby taking longer than would be desirable.

A prior art method designed to speed up such operations involves using direct memory access to write data to a destination, but this still introduces some latency in the form of the overhead involved in the direct memory access operation. Furthermore, using direct memory access adds a great deal of complexity. This is especially true where multiple processors are being used, in which case the coordination of the direct memory access and the processors becomes extremely complex, and thus prone to error.

What is needed are methods, computer systems and integrated circuits to efficiently manage buffer output without introducing unnecessary latency or involving the inherent complexity of direct memory access.

SUMMARY OF INVENTION

Methods, computer systems and integrated circuits facilitate automatic self-triggering output of buffer contents. At least one processes writes control data to at least one buffer, the control data being such that a buffer output trigger address can be determined therefrom. For each buffer to which control data is written, a buffer output manager determines the trigger address of that buffer from the control data. At least one process writes data to at least one buffer, including to the trigger address thereof. For each buffer to which data is written to the trigger address, the buffer output manager automatically outputs the contents of that buffer, responsive to the writing of the data to the trigger address. In some embodiments, a plurality of processes write to a plurality of buffers in parallel, and the buffer output manager outputs buffer contents in order for each process, based on the order in which that process wrote to the trigger addresses of the various buffers being output.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
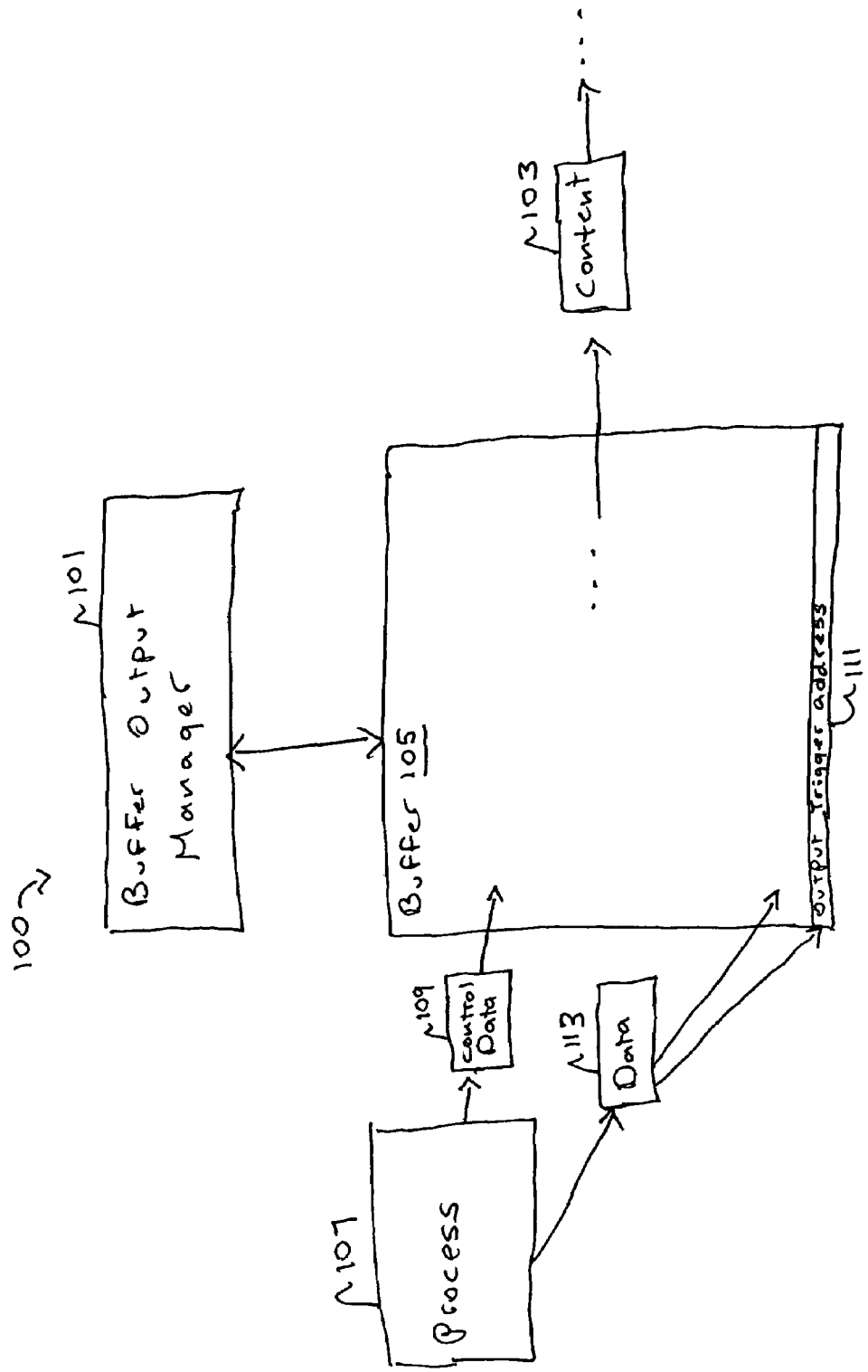
FIG. 1 is a block diagram illustrating a high level overview of a system for practicing some embodiments of the present invention.

FIG. 1 illustrates a high level overview of a system 100 for practicing some embodiments of the present invention. A buffer output manager 101 facilitates the automatic self-triggering of the outbound processing of the content 103 of at least one buffer 105, according to some embodiments of the present invention. It is to be understood that although the buffer output manager 101 is illustrated as a single entity, as the term is used herein a buffer output manager 101 refers to a collection of functionalities which can be implemented as hardware, software, firmware or any combination of these. Where a buffer output manager 101 is implemented as software, it can be implemented as a standalone program, but can also be implemented in other ways, for example as part of a larger program or as a plurality of separate programs. Additionally, buffers 105 can be instantiated in software, hardware, firmware or any combination of these.

As illustrated in FIG. 1, a process 107 writes control data 109 to a buffer 105. The control data 109 comprises at least information from which an output trigger address 111 for the buffer 105 can be determined. When data 113 is written to a buffer's 105 output trigger address 111, the buffer output manager 101 automatically processes the output of that buffer 105. An example of an output trigger address 111 is the address of the last word of the buffer 105. The control data 109 can, for example, comprise the size of the buffer, or the output trigger address 111 itself. The control data 109 can but need not comprise additional information, such as interrupt logic, loopback logic, etc.

For each buffer 105 to which control data 109 is written, the buffer output manager 101 determines the trigger address 111 of that buffer 105 from the control data 109. For example, depending upon the format of the control data 109, the buffer output manager 101 can add the buffer size to the starting address of the buffer 105 to calculate the trigger address 111, or simply read the trigger address 111 from the control data 109 itself.

As noted above, when a process 107 writes data 113 to the trigger address 111 of a buffer 105, the buffer output manager 101 automatically processes outputting the content 113 of that buffer 105, responsive to the writing of the data 113 to the trigger address 111.

Figure 2:
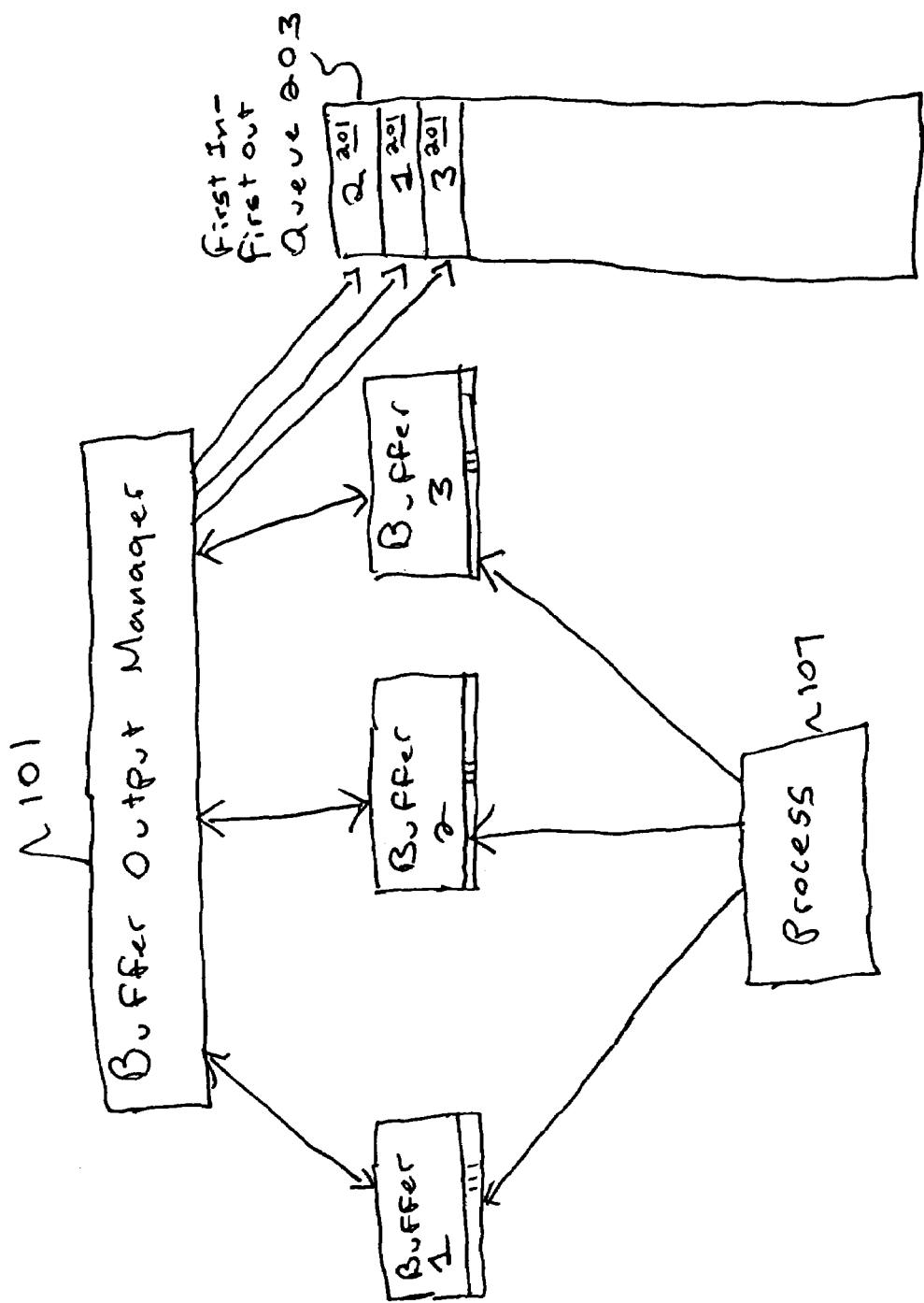
FIG. 2 is a block diagram illustrating an example of a process writing to a plurality of buffers in parallel, according to one embodiment of the present invention.

As illustrated in FIG. 2, it is to be understood that one or more processes 107 can write to a plurality of buffers 105 in parallel, and/or in any order. The buffer output manager 101 outputs buffer 105 contents 103 in the order in which data 113 is written to the associated trigger addresses 111. For example, in some embodiments as illustrated in FIG. 2, whenever data 113 is written to the trigger address 111 of a buffer 105, the buffer output manager 101 stores an identifier 201 for the buffer 105 (e.g., a buffer number or name) in a First In-First Out Queue 203, and executes the outbound processing of buffers 105 in queued order. Thus, when a buffer 105 is filled (i.e., data is written to its trigger address), the buffer 105 is queued for outbound processing. In the example illustrated in FIG. 2, the three buffers 105 are filled in the order 2, 1, 3, and the buffer output manager 101 writes corresponding identifiers 201 to the queue 203 accordingly. As described above, the buffer output manager 101 outputs the contents 103 of the buffers 105 in queued order. Of course, in other embodiments, mechanisms other than queues 203 can be utilized to maintain this ordering.

In some embodiments, each process 107 of a plurality 107 of processes 107 (not illustrated) can write to multiple buffers 105 in parallel. In such embodiments, for each process 107, the buffer output manager 101 facilitates the outbound processing of buffers 105 written to by that process 107 in the order in which data 113 is written to the associated trigger addresses 111. For example, in embodiments in which the buffer output manager 101 utilizes a First In-First Out Queue 203 to manage output ordering, the buffer output manager 101 would maintain a separate queue 203 (not illustrated) for each process 107, and thus maintain ordering for outputting buffers 105 at a process 107 level.

In some embodiments of the present invention, a process 107 writes data 113 to addresses in a buffer 105 other than the trigger address 111, and subsequently writes data 113 to the trigger address 111 to cause the buffer output manager 101 to output the contents 103 of the buffer 105. It is to be understood that a process 107 can write data 113 to any address of a buffer 105, in any order. In some embodiments, a process 107 can repeatedly write data 113 to the trigger address 111 of a buffer 103, thereby causing the buffer output manager 101 to output the contents 103 of the buffer 105 multiple times. In some embodiments, a process 107 can use write combining to fill a buffer 105 with a contiguous block of data 113, rather than performing a series of individual write operations. Where the buffer 105 addresses to which the contiguous block of data 113 is written include the trigger address 111, the buffer output manager 101 automatically outputs the contents 103 of the buffer 105 in response.

In some embodiments of the present invention, when a process 107 writes control data 109 to a buffer 105, the buffer output manager 101 locks the buffer 105 such that only the writing process 107 can access the buffer 105. In such embodiments, the buffer output manager 101 unlocks the buffer 105 after the process 107 has written to the trigger address 111, and the contents 103 of the buffer 105 has been output. This locking functionality keeps other processes 107 from corrupting a buffer 105 as a process 107 is writing thereto.

In some embodiments of the present invention, the buffer output manager 101 uses write combining to output the contents 103 of a buffer 105 as a contiguous block, rather than performing a series of individual write operations. This saves time and processing cycles. In other embodiments, the buffer output manager 101 simply uses a plurality of write operations to output buffer 105 contents 103.

Figure 3:
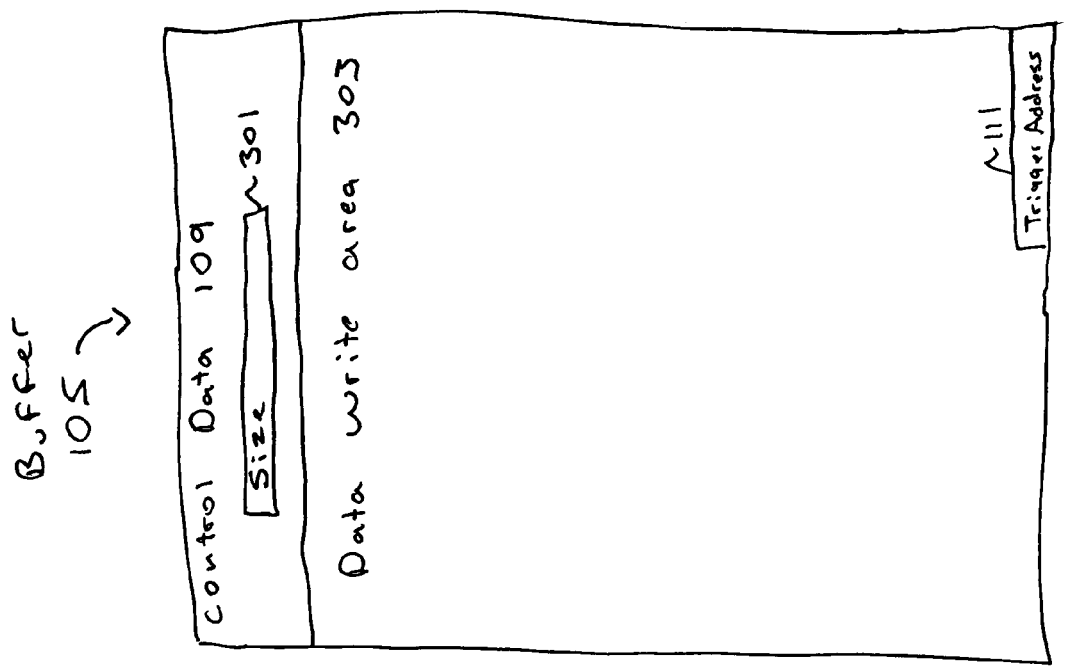
FIG. 3 is a block diagram illustrating an example of a buffer, according to one embodiment of the present invention.

FIG. 3 illustrates an example of a buffer 105, according to some embodiments of the present invention. Control data 109 is located (for example) at the head of the buffer 105, and includes (in this example) the size 301 of the buffer 105. A data to write area 303 follows the control information 109. Processes 107 can write data 113 to this area 303, which will be output in response to data 113 being written to the trigger address 111. In the example illustrated in FIG. 3, the trigger address 111 comprises the last word of the data to write area 303.

In some embodiments of the present invention, the buffers 105 and buffer output manager are instantiated as part of an integrated circuit, but it is to be understood that they can be implemented on other types of computing devices as well, such as personal computers, routers, firewalls, etc. In some embodiments of the present invention, at least some of the processes 107 that write to the buffers 105 are located on computing devices external to the integrated circuit (or other computing device) on which the buffers 105 are located. In other embodiments, the processes 107 and the buffers 105 are located on the same computing device.

As will be understood by those familiar with the art, the invention may be embodied in other specific forms without departing from the spirit or essential characteristics thereof. Likewise, the particular naming and division of the modules, portions, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, portions, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for self-triggering output of buffer contents, the method comprising:

writing, to at least one buffer, control data from which a buffer output trigger address can be determined;

for each buffer to which control data is written, determining a trigger address of that buffer from the control data;

writing data to the trigger address of at least one buffer;

for each buffer to which data is written to the trigger address, automatically outputting contents of that buffer responsive to the writing of the data to the trigger address;

locking a buffer once control data is written thereto, such that only a writing process can access the buffer; and unlocking the buffer after the contents of the buffer has been output.

2. A computer system for self-triggering output of buffer contents, the computer system comprising:

a portion configured to write, to at least one buffer, control data from which a buffer output trigger address can be determined;

a portion configured to, for each buffer to which control data is written, determine a trigger address of that buffer from the control data;

a portion configured to write data to the trigger address of at least one buffer;

for each buffer to which data is written to the trigger address a portion configured to automatically output contents of that buffer responsive to the writing of the data to the trigger address;

a portion configured to lock a buffer once control data is written thereto, such that only a writing process can access the buffer; and a portion configured to unlock the buffer after the contents of the buffer has been output.

3. A method for self-triggering output of buffer contents, the method comprising:

at least one buffer receiving control data from which a buffer output trigger address can be determined;

for each buffer which receives control data, determining a trigger address of that buffer from the control data;

at least one buffer receiving data at its trigger address;

for each buffer which receives data at its trigger address, automatically outputting contents of that buffer responsive to the writing of the data to the trigger address;

locking a buffer responsive to control data being received thereby, such that only a writing process from which the control data was received can access the buffer; and unlocking the buffer after the contents of the buffer has been output.

* * * * *

UNITED STATES PATENT AND TRADEMARK OFFICE
CERTIFICATE OF CORRECTION

| | |
|---|---|
| PATENT NO. | : 7,308,535 B1 |
| APPLICATION NO. | : 10/927170 |
| DATED | : December 11, 2007 |
| INVENTOR(S) | : Dave Olson |

Page 1 of 1

It is certified that error appears in the above-identified patent and that said Letters Patent is hereby corrected as shown below:

In column 5, line 20, in Claim 2, after "address" insert -- , --.

In column 6, line 15, in Claim 3, before "writing" delete "the".

Signed and Sealed this

Eleventh Day of May, 2010

David J. Kappos
*Director of the United States Patent and Trademark Office*